US005310598A

United States Patent [19]

Yoshinaka et al.

[11] Patent Number: 5,310,598

[45] **Date of Patent: * May 10, 1994**

[54] RADIO WAVE ABSORBING MATERIAL

[75] Inventors: Minoru Yoshinaka; Eizo Asakura; Mitsumasa Oku, all of Osaka; Kouziro Matsuo, Yamatokoriyama; Hidenosuke Nakamura, Osaka, all of Japan

[73] Assignee: Matsushita Electric Industrial Co., Ltd., Osaka, Japan

[ * ] Notice: The portion of the term of this patent subsequent to Oct. 2, 2007 has been disclaimed.

[21] Appl. No.: 804,541

[22] Filed: Dec. 11, 1991

Related U.S. Application Data

[63] Continuation of Ser. No. 451,856, Dec. 18, 1989, abandoned.

[30] Foreign Application Priority Data

| | | | |
|---|---|---|---|
| Dec. 19, 1988 | [JP] | Japan | 63-321005 |
| Feb. 17, 1989 | [JP] | Japan | 1-38613 |
| Mar. 7, 1989 | [JP] | Japan | 1-54012 |
| Apr. 3, 1989 | [JP] | Japan | 1-84460 |

[51] Int. Cl.[5] .................. H01Q 17/00; B32B 5/16; B32B 9/00; D02G 3/00

[52] U.S. Cl. .................. 428/328; 428/404; 428/692; 428/697; 428/698; 428/910; 428/919; 428/928; 428/401; 342/1

[58] Field of Search .................. 428/391, 910, 919, 928, 428/401, 404, 692, 697, 698; 342/1

[56] References Cited

U.S. PATENT DOCUMENTS

| | | | |
|---|---|---|---|
| 2,267,720 | 12/1941 | Cyr et al. | 422/158 |
| 2,331,599 | 10/1943 | Cyr | 423/623 |
| 2,923,934 | 2/1960 | Halpern | 428/332 |
| 2,948,639 | 8/1960 | Price | 524/733 |
| 2,951,247 | 8/1960 | Halpern et al. | 428/919 |
| 2,992,425 | 7/1961 | Pratt | 428/900 |
| 3,526,896 | 9/1970 | Wesch | 342/1 |
| 4,176,100 | 11/1979 | Rider | 524/432 |
| 4,198,850 | 4/1980 | Firth et al. | 73/31.05 |
| 4,380,196 | 4/1983 | Kato et al. | 101/401.1 |
| 4,766,048 | 8/1988 | Hisamura | 430/58 |
| 4,948,690 | 8/1990 | Hisamura et al. | 430/60 |
| 4,960,654 | 10/1990 | Yoshinaka et al. | 428/614 |
| 5,164,260 | 11/1992 | Yoshinaka et al. | 428/328 |

FOREIGN PATENT DOCUMENTS

| | | |
|---|---|---|
| 0325797 | 8/1989 | European Pat. Off. . |
| 50-6597 | 1/1975 | Japan . |
| 61205627 | 9/1986 | Japan . |

OTHER PUBLICATIONS

English translation of 50-6597, Jan. 1975, Umebera et al.

Kubo et al, "Polarity of ZnO Crystal (I) Ion Bombarding Behavior", Japanese Journal of Applied Physics, vol. 8, May 1969, No. 5, pp. 626-627.

Sharma et al, "Growth of ZnO Whiskers, Platelets, and Dendrites", Journal of Applied Physics, vol. 42, No. 13, Dec. 1971, pp. 5302-5304.

Sakurai et al., "Formation of Needle-like Zinc Oxide Particles and the Analysis of Particle Morphology", Chemical Abstracts, vol. 101, No. 6, Aug. 1984, p. 117, abstract No. 40553t.

English Translation of Reference "T", pp. 1-20.

Billman, A., "Vapor-phase Growth of Zinc Oxide Monocrystals", C. R. Acad. Sc. Paris, t. 270, 170-Series B, pp. 1-5, 1970.

English translation of French article cited in "V", pp. 1-5.

Shiojiri et al, "Structure and Growth of ZnO Smoke Particles Prepared by Gas Evaporation Technique", *J. Crystal Growth*, 52 (1981), pp. 173-177.

Suyama, "Shape and Structure of Zinc Oxide Particles Prepared by Vapor-Phase Oxidation of Zinc Vapor", *J. Am. Ceram. Soc.*, 71 [5] (1988), pp. 391-395.

*Primary Examiner*—George F. Lesmes
*Assistant Examiner*—Terrel Morris
*Attorney, Agent, or Firm*—Lowe, Price, LeBlanc & Becker

[57] ABSTRACT

A radio wave absorbing material comprising zinc oxide whiskers. In a preferred embodiment, the zinc oxide whiskers are comprised of a central part and needle crystal projections extending from said central part in plural different axial directions.

9 Claims, 6 Drawing Sheets

RADIO WAVE ABSORBING MATERIAL

This application is a continuation of application Ser. No. 07/451,856, filed Dec. 18, 1989, now abandoned.

BACKGROUND OF THE INVENTION

1. Field of the Invention

This invention relates to a radio wave absorbing material. More particularly, it relates to a radio wave absorbing material with high performance, capable of absorbing and attenuating radio waves such as VHF, UHF, microwaves, radar waves, semi millimeter waves, and millimiter waves over a wide band.

2. Description of the prior Art

Radio wave absorbing materials have been hitherto comprised of a ferrite sinter or ferrite powder, a semiconductor carbon fiber or powder, or a metallic fiber, dispersed in a rubber or resin, in a foamable styrol or urethane, or in an nonwoven fabric. Recently, as Japanese Laid-open Patent Application No. 62-123799 discloses, also proposed is a radio wave absorbing material comprising an electrically insulating potassium titanium short fiber whose surface is reduced or coated to make it semiconductive $10^{-2}$ to $10^{-2}\Omega$.cm; pressed powder state; 100 kg/cm$^2$ which is compounded into a resin. This, however, can not necessarily give a satisfactory performance in respect of the radio wave absorption.

As Japanese Laid-open Patent Application No. 63-12198 discloses, further proposed is a radio wave absorbing electromagnetic shielding material comprising a ferromagnetic powder whose particle surfaces are coated with a conductive material having a conductivity of from $10^{-2}$ to $10^2\Omega$.cm. This material, however, rather lays emphasis on electromagnetic shielding, with a lower radio wave absorbing performance, and thus necessarily results in a radio wave absorbing material with a narrow band.

Namely, the conventional radio wave absorbing materials have been greatly problemsome as having the following various problems.

Such problems include the problem concerning the directionality in radio wave absorption with respect to the direction of incidence of radio waves or the polarized waves, the problem of absorption performance, and the problem in wide-band absorption. There are additional problems that the radio wave absorbing performance is greatly affected by weathering resistance or stability of characteristics when radio wave absorbing materials are actually designed, manufactured and put into practical use, by adhesion to reflection plates (or materials) or the like or flexibility of radio wave absorbing materials when they are worked, or fur&her by deformation such as warpage when they are actually used, and that radio wave absorbing components accelerate the wear of machines when the radio wave absorbing materials are prepared using a kneader, a stirrer, a molding machine-or the like.

Thus, it has been strongly sought to provide a radio wave absorbing material that can eliminate or solve these many problems.

SUMMARY OF THE INVENTION

The present invention was made as a result of intensive studies to solve the above problems, thus providing a radio wave absorbing material having a very high performance.

Briefly stated, the present invention is a radio wave absorbing material that employs a novel material, using zinc oxide (hereinafter "ZnO") whiskers.

ZnO whiskers are each not less than 3 μm in length from the base to top. The ZnO whiskers are preferably also comprised of a central part and needle crystal projections extending from said central part in plural different axial directions. The ZnO whiskers also preferably have four axis in respect of the needle crystal projections extending in plural axial directions.

In another embodiment, the present invention is a radio wave absorbing material comprising any one, or a combination, of particles or fibers of ferrite, carbon, conductive potassium titanate, conductive silicon carbide, and a metal, in which ZnO whiskers are used in any of a mixed form, a dispersed form or a laminated form, or in a combined form of any of these.

In still another embodiment, the present invention is a radio wave absorbing material comprising ZnO whiskers whose surfaces are coated with a magnetic material.

In a further embodiment, the present invention is a radio wave absorbing material comprising any of the above various radio wave absorbing materials, each of which is held with a holding material, or mixed or dispersed in a holding material. Resins, rubbers, coating materials, ceramics, glasses, concretes, mortars, inorganic or organic fibers, grains, powders or flakes, inorganic binders or organic binders, waxes, gel-like semisolid substances, or foams can be used as the holding material.

DETAILED DESCRIPTION OF THE PREFERRED EMBODIMENTS

Figure 1:
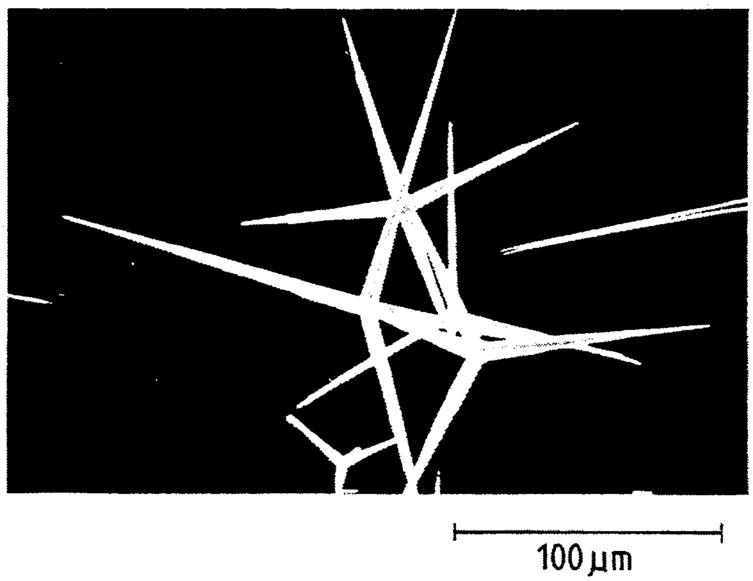
FIGS. 1 and 2 are electron micrographs to show crystal shape of ZnO whiskers used in the present invention.

Though still unclear in many points, the mechanism by which the radio wave absorbing material of the present invention shows radio wave absorption characteristics with a far higher performance than these of conventional materials is presumed as follows:

In the first place, the radio wave absorbing material of the present invention has by itself the action of effectively leading radio waves to the inside of the absorbing material. Reasons therefor are firstly that there occurs less reflection of radio waves because of the ZnO whiskers themselves provided with appropriate semiconductivity and dielectric constant: secondly that the ZnO whiskers have a three-dimensional tetrapod structure (FIG. 1). which is quite different from the conventional whiskers of short-fibrous form, and thus can readily form a three-dimensional mesh structure with appropriate voids when they aggregate; and further that the ZnO whiskers, quite different in image from conventional whiskers, are entirely comprised of right single crystals, have less irregularities on their surfaces, and have colorless, transparent and glossy surfaces, thus causing less reflection of radio waves.

In the second place, the radio wave absorbing material of the present invention has the action of absorbing radio waves with a far higher performance than the conventional materials, which is for the following reasons.

A first reason is that the radio waves can be effectively led to the inside of the absorbing material as mentioned above to have more opportunities to come into contact with radio wave absorbing components, so that an effective radio wave absorbing performance can be obtained. A second reason is that the ZnO whiskers each have the tetrapod shape and are randomly oriented on the average, thus being powerful regardless of the direction of incidence of radio waves and also powerful to any kind of polarized waves. A further reason is that, different from commonly available short-fibrous whiskers, the ZnO whiskers can readily form the three-dimensional mesh structure. Thus, when radio waves have arrived, they attain a sort of loop antenna effect in electromagnetic induction to exhibit a highly efficient absorption. Still further reasons are that when the tetrapod-like ZnO whiskers are dispersed in a matrix, they can be dispersed in a uniform state with appropriate intervals between the respective whiskers, so that a highly efficient absorbing material can be obtained: the tops of needle crystals of the ZnO whiskers are so extremely sharp that a very strong electric field results at the tops, so that a large radio wave absorption can be attained at that portions; the ZnO whiskers are comprised of uniform single crystals as a whole, and, different from those merely surface-processed, the whiskers forms a semiconductor as a whole to give a uniform radio wave absorbing material, thus resulting in a radio wave absorbing material with a good efficiency; they are a semiconductor having so large an aspect ratio that a large polarization can be expected, thus promising a radio wave absorbing material which is large in both $\epsilon'$ and ?"; different from conventional radio wave absorbing materials, the radio wave absorbing material of the present invention is a material endowed with high photoconductivity or varistor characteristics; and also, from the viewpoint of magnetic properties, ZnO is a diamagnetic material with a magnetic susceptibility of $0.31\times10^{-6}/0°$ C. (c.g.s. unit), which has been used by mixture in ferrite so that a special property can be exhibited, and therefore the magnetic effect resulting therefrom can be well presumed to be one of the reasons for the good performance. Thus, it can be presumed that conjointly with the nearly unparallelled and multi-functional properties possessed by the ZnO material, the unique morphological, crystalline, semiconductive and magnetic properties of the ZnO whiskers have acted to give the radio wave absorbing material with high performance.

The ZnO whiskers can also promote the improvement in adhesion, because of their tetrapod forms and sharp needle-like forms, and also because of the strength or reinforcement action inherent in the whiskers.

In the case of composite materials, the radio wave absorbing material can be prevented from being warped and its dimensional stability can be assured, because of the isotropic orientation attributable to the tetrapod shape.

In addition, since the ZnO is a metal oxide, there may proceed no oxidation deterioration, and also since it is endowed with ultraviolet absorbency or choking resistance, a superior weathering resistance can be promised.

The whiskers can also be uniformly dispersed and free from any oxidation deterioration, as mentioned above, so that the characteristics of the individual radio wave absorbing materials ma not be scattered. Hence, materials also stable with time can be obtained.

The ZnO whiskers, which themselves have a hardness of from 4 to 4.5 and have cleavage faces at right angles to the C axes, are also very flexible whiskers, and thus can impart flexibility to composites thereof, together with the reinforcing effect.

A ZnO whisker is a relatively soft radio wave absorbing material, different from ferrite or SiC, so that the molding machines or the like can be suppressed from being worn.

In another embodiment, the radio wave absorbing material of the present invention can serve as a highly efficient radio wave absorbing material comprised of a systematic combination of magnetic loss and high conductive loss.

The ZnO whiskers firstly comprise conductive single crystals having an appropriate resistivity, and a highly efficient magnetic loss at the surfaces of ZnO whiskers can be expected when their surfaces are coated with a magnetic material. Then the radio waves having passed through the magnetic layer thus formed enter into the ZnO whiskers, where an efficient absorption occurs as described above. Thus, the present invention according to this embodiment is a radio wave absorbing material comprised of a systematic and effective combination of magnetic loss and conductive loss.

In still another embodiment, the present invention is a mixed radio wave absorbing material in which particles or fibers of ferrite, carbon, conductive potassium titanate whiskers, metals or the like and the ZnO whiskers are used in a mixed form. The ZnO whiskers are provided with various advantages as described above, and can greatly improve the performance of the conventional radio wave absorbing materials.

Namely, the ZnO whiskers can lead radio waves to the inside of the absorbing material and also give more opportunities to come into contact even with conventional radio wave absorbing materials such as ferrite and carbon, so that an effective radio wave absorbing performance can be obtained.

In addition to the above effect, the material formed into a mixture can improve the adhesion, prevention of warpage deformation, dimensional stability, and weathering resistance of the radio wave absorbing material.

The present invention will now be described below by giving more specific embodiments. The present invention, however, is by no means limited to these.

Figure 2:
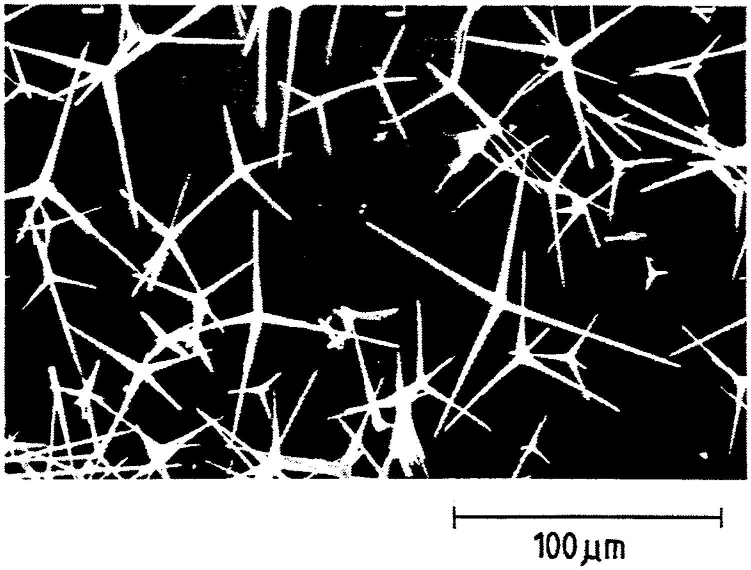

In the present invention, quite novel ZnO whiskers are used in the radio wave absorbing material. Among the ZnO whiskers, ZnO whiskers with the tetrapod shape (FIG. 1) are particularly remarkable in view of their characteristics. The ZnO whiskers of this type can be formed by subjecting metallic zinc powder having oxide layers on its particle surfaces, to heat treatment in an oxygen-containing atmosphere. The tetrapod-like ZnO whiskers thus obtained have an apparent bulk density of from 0.02 to 0.1, and can be very readily mass-produced in a yield of not less than 70 wt. %. FIGS. 1 and 2 are electron micrographs of the whiskers, demonstrating an example of the product thus formed. As will be seen therefrom, the morphological and dimensional features as previously described can be clearly recognized (i.e., the tetrapod shape).

Incidentally, in some tetrapod-like ZnO whiskers, those having the needle crystal projections of three axes, two axes and also one axis are mixed. They, however, are those in which part of originally four-axial crystals has been broken. Care must also be well taken when the tetrapod-like ZnO whiskers are mixed in rubber, resin, ceramics, glass or the like. Otherwise it may often occur that the whiskers lose their tetrapod shape when they are blended or molded, resulting in their changes into simple needle whiskers.

X-ray diffraction patterns taken on the present tetrapod-like ZnO whiskers showed peaks of ZnO in all instances. Results of electron diffraction also showed monocrystallinity with less transition and lattice defects. Impurities were also in so a small content that ZnO was found to comprise 99.98% as a result of atomic-absorption spectroscopy.

On the other hand, it is also possible to form simple needle ZnO whiskers. For example, metallic zinc powder and charcoal may be simultaneously fired to form the whiskers on the wall of a crucible, but without any mass-productivity.

A system in which ZnO whiskers of less than 3 $\mu$m in lengths at the needle crystal projections hold a greater proportion (e.g., not less than 99 wt. %) is not preferred in view of the radio wave absorbing performance. Preferably, it is desirable to use not less than 3 wt. % of ZnO whiskers of not less than 30 $\mu$m in lengths at the needle crystal projections, and more preferably, not less than 70 wt. % of ZnO whiskers of not less than 50 $\mu$m in lengths at the needle crystal projections.

The ZnO whiskers should preferably have an aspect ratio of nor less than 3 in average, and more preferably not less than 10 in average. The value obtained by dividing the diameter at the top of the needle crystal projection by the diameter of the base thereof should be not more than 0.8, preferably not more than 0.5, and more preferably not more than 0.1, on account of the radio wave absorbing performance.

The ZnO whiskers used in the present invention can have a resistivity within the range of from 10 to $10^8\Omega$.cm in a pressed powder state (0.2 mm thick; 5 kg/cm$^2$, 50 VDC), which may be selected depending on the purpose. The ZnO whiskers, however, may preferably have a resistivity of from $6\times10^2$ to $8\times10^5\Omega$.cm in view of the radio wave absorbing performance, and particularly effectively from $5\times10^3$ to $8\times10^4\Omega$.cm when the production cost is taken into account. When the tetrapod-like ZnO whiskers ($1\times10^4\Omega$.cm at 5 kg/cm$^2$, 0.2 mm thick) falling under the above range are used, a pressed powder compact (5 mm thick) thereof at 350 kg/cm$^2$ showed a resistivity of $1.2\times10^7\Omega$.cm.

The resistivity of the ZnO whiskers used in the present invention can also be varied depending on firing conditions, by reduction-firing, or by doping with other elements as exemplified by Al, Li and Cu according to a suitable method.

The radio wave absorbing material of the present invention can be used in various forms.

More specifically, it can be used in the state of a powder of ZnO whiskers, the state of a deposit thereof, and the state of a sinter thereof, as well as the state in which ZnO whiskers are held with holding materials of various types in suitable manners and forms.

The ZnO whiskers in the state of a powder can be used in such a way that they are put in a container or bag made of woven fabrics, nonwoven fabrics, ceramics, glasses, resins, rubbers, concretes, mortars, waxes, gel-like semi-solid substances, or foams, or they are enveloped with these materials.

The ZnO whiskers in the state of a deposit refer to ZnO whiskers formed into whisker papers by papermaking methods, or ZnO whisker deposits formed by filtration according to wet filtration (such as vacuum filtration). In this instance, suitable organic or inorganic binders can be used.

The ZnO whiskers in the form of a sinter can also be used, which is obtained by sintering at a suitable temperature (from 500° to 1,600° C.) an aggregate of ZnO whiskers while pressing it, or after pressing it, under a suitable pressure. In this instance, it is effective to use a suitable amount of a sintering aid commonly used. There are no particular limitations on the pressure for the pressing, but the pressing may be carried out within the pressure range of from 1 to 2,000 kg/cm$^2$, and particularly from 10 to 400 kg/cm$^2$ to give good results.

The holding material may be either radio-wave-absorptive or radio-wave-transmissive. All sorts of resins can be used as the holding materials of ZnO whiskers. Specifically, both thermosetting resins and thermoplastic resins can be used.

Regarding first the thermosetting resins, usable resins include epoxy resins, unsaturated polyester resins, urethane resins, silicone resins, melamine-urea resins, and phenol resins, to which, however, they are not limited.

Regarding next the thermoplastic resins, usable resins include polyvinyl chloride, polyethylene, chlorinated polyethylene, polypropylene, polyethylene terephthalate, polybutylene terephthalate, polyamide, polysulfone, polyetherimide, polyethersulfone, polyphenylene sulfide, polyether ketone, polyether ether ketone, ABS resin, polystyrene, polybutadiene, methyl methacrylate, polyacrylonitrile, polyacetal, polycarbonate, polyphenylene oxide, an ethylene/vinyl acetate copolymer, polyvinyl acetate, an ethylene/tetrafluoroethylene copolymer, aromatic polyesters, polyvinyl fluoride, polyvinylidene fluoride, polyvinylidene chloride, and Teflon, to which, however, they are not limited.

In this instance, it is preferred for the tetrapod-like ZnO whiskers or needle-like ZnO whiskers to be held with the holding material in the state they are not broken as far as possible, particularly from the viewpoint of the radio wave absorbing performance. Thus, it is possible to apply various methods that have been hitherto devised for the purpose of this kind. More specifically, it is possible to apply the mixing, kneading, extrusion, or molding in which the stress or shear to the ZnO whiskers are minimized. In this regard, it is preferred to use a method comprising mixing ZnO whiskers in a thermosetting resin such as epoxy resin, unsaturated polyester resin, urethane resin and silicone resin in the state of a liquid phase with a relatively low viscosity, followed by molding and then pouring. It is also possible to use a method comprising dissolving a resin in a suitable solvent to give a state of a low-viscous solution, mixing ZnO whiskers in it, and thereafter evaporating the solvent. It is also preferred to use a method comprising mixing fine resin powder of several $\mu$m to several 10 $\mu$m in particle size and ZnO whiskers, and thereafter melting the resin component by the action of heat or a solvent, thus holding the ZnO whiskers.

The rubber material used as the holding material may include natural rubbers and synthetic rubbers, but preferably include rubber materials that may not adversely affect ZnO whiskers and have excellent radio wave absorbing performance. In this regard, polyurethane rubbers are most preferred. What are secondly preferred include acrylic rubbers, silicone rubbers, butadiene rubbers, isobutylene rubbers, polyether rubbers, isobutylene-isopurene copolymers, and isocyanate rubbers. Besides these, all sorts of elastomers may be used. Nitrile rubbers, Chloroprene rubbers, chlorosulfonated polyethylenes, polysulfide rubbers, and fluorine rubbers may also be used depending on the purpose. There may also be used materials comprising a natural rubber dissolved in a solvent, those comprising polyethylene fine powder dispersed in water, emulsions of polymers, and so forth. Needless to say, also when the rubber material is used as the holding materials, it is more preferred to use the commonly available method that can suppress the break of whiskers as far as possible. Also needless to say, various additives, fillers, etc., commonly used, are used at the same time.

It is also possible to disperse the ZnO whiskers in various coating materials, or to make coating materials serve as the holding materials. More specifically, the coating materials may include those of an epoxy type, an acrylic type, or a urethane type, to which, however, they are not limited, and other all sorts of coating materials can be used. In particular, coating materials with a high thermal resistance and weathering resistance are more preferred.

Various inorganic solid materials (powdery, fibrous, flaky, granular or solid) may also be used as the holding material, in which the ZnO whiskers may be dispersed so that the radio wave absorbing material can be constituted.

Stated specifically, the ZnO whiskers may be dispersed in, or held on, ceramics of various types, glasses, enamels, etc. to Give the rad±o wave absorbing material. The ZnO whiskers may also be dispersed in powdered clay, glass fiber, asbestos, mica, sand or the like, thus giving the radio wave absorbing material or a radio wave absorbing fibrous aggregate (in a woven or non-woven state).

As another example, concretes, mortars, etc. can also be used as the holding material.

It is also possible to use waxes such as paraffin wax, polyethylene wax, and microcrystalline wax as the holding material.

It is further possible to use as the holding material, gel-like semi-solid substances such as agar and gelatin, or highly viscous and adhesive substances such as pastes, rubber pastes, and highly viscous polybutene. All sorts of foams are further suited as the holding material. In particular, foams of a urethane type are excellent in view of their characteristics. Those of an epoxy type are secondly preferred, and those of a styrene type are thirdly preferred.

In the holding material system as described above, it becomes possible to recognize the radio wave absorbing performance when at least about 5 wt. % of ZnO whiskers are dispersed. The performance becomes remarkable when at least 10 wt. % of ZnO whiskers are dispersed. Thus, a great absorption effect can be achieved even when they are used in a very small amount. The amount, however, is not limited to the above, since the effect may vary depending on the intensity of radio waves, size of ZnO whiskers, degree of break of whiskers, shape thereof, materials for matrices, types of holding materials, and holding forms.

In some instances, there is no problem at all if other particulate or fibrous radio wave absorbing base materials of a carbon type, silicon carbide type, ferrite type, metal type, or conductive potassium titanate type are used in combination or mixed. An effective amount for the ZnO whiskers to be mixed is not less than 1 wt. %, and preferably not less than 5 wt. %, based on the total mixed components.

The magnetic material with which the surfaces of ZnO whiskers are coated includes soft magnetic materials or hard magnetic materials; metal magnetic materials such as iron, cobalt, nickel, and alloys thereof; and oxide magnetic materials such as ferrite as well as permanent magnetic materials, ferromagnetic materials, diamagnetic material, and ferromagnetic materials; which may be selected depending on the purpose. In particular, oxide magnetic materials showing a large $\mu''$ at the frequencies used are preferred.

Stated specifically, among ceramic ferromagnetic materials represented by the formula: MO $Fe_2O_3$, preferred is a polycrystalline composite ferrite having inverse spinel structure and in which two or more kinds of divalent ions are mixed as $M^{2+}$. More specifically, $M^{2+}$may be mainly composed of (Ni,Zn), (Ni,Cu,Zn), (Ni,Mg,Zn), (Ni,Zn,Co), (Ni,Cu,Zn,Co), (Mn,Zn). or (Cu,Zn), these of which can give preferable results.

Besides, it is also possible to use materials of a "Ferroxprena" (trade name; a product of Philips Co., The Netherlands) type, which are hexagonal and belong to ferrite.

The magnetic materials may be applied to give a coating thickness ranging from 50 Å to 200 μm, and particularly effectively from 100 Å to 5,000 Å. Regarding the manner of coating, they may be in the entire coating, partial coating, or local coating, thereby bringing about great effects according to the corresponding uses.

As methods of coating the surfaces of ZnO whiskers with the magnetic material, various methods can be used. In particular, preferred methods are plating such as electrolytic plating or electroless plating, vapor deposition such as vacuum deposition, emulsion coating (a solution in which fine particles are dispersed is coated on the whisker surfaces, and then dried), and coating-material coating (fine particles are dispersed in a coating material or composition, and the resulting dispersion is coated on whisker surfaces, followed by drying).

In the radio wave absorbing material of this system also, it is possible in some instances to use in combination or mix other radio wave absorbing base materials (ZnO whiskers, and materials of a carbon type, silicon carbide type, ferrite type, metal type, or conductive potassium titanate type), thereby further improving the performance.

In the radio wave absorbing material of the present invention, there are no limitations on the frequencies and intensity of the radio waves so long as they have the frequencies and intensity that are enough for its radio wave absorbing effect to be practically obtained. In particular, however, the radio wave absorbing material can be applied for VHF, UHF, microwaves, radar waves, semi-millimeter waves, millimiter waves, etc. From the viewpoint of frequencies, it can be applied for a frequency band of from 100 MHz to 100 GHz, preferably from 100 MHz to 20 GHz, more preferably from 1 GHz to 15 GHz. and most preferably from 10 GHz to 15 GHz. Thus, the present material can serve as a radio wave absorbing material over a wide band range and with a high absorption.

EXAMPLES

The present invention will be described below in greater detail by giving Examples.

EXAMPLE 1

Metallic zinc powder having oxide layers on its particle surfaces was heated in an atmosphere containing oxygen to form tetrapod-like ZnO whiskers. The resulting ZnO whiskers were 100 μm in average length from the base to the top of the needle crystal projection, and 5 μm in average diameter at the base, most of which had the tetrapod shapes. The resistivity was $2.5\times10^4\Omega$.cm under conditions of 5 kg/cm$^2$, 50 VDC, 200 μm thick.

Next, a two-part low-viscosity epoxy resin comprising a main agent Araldite CY205 (Nagase CIBA Ltd.) and a curing agent CV5032 (MDH-4; Mastushita Electric Works Ltd.) was prepared, into which the above ZnO whiskers (16 wt. %) were manually gently mixed. The mixture was blended at 120 r.p.m. for 2 minutes and then preheated at 60° C. for 15 minutes, followed by deaeration under reduced pressure (for 15 minutes). Thereafter, the resulting epoxy resin composition was poured into a mold preheated to 80° C., and deaeration was further carried out under reduced pressure for 15 minutes, followed by curing under conditions of a curing temperature of 90° C. and a curing time of 5 hours.

The sample thus obtained was plate-like (4 mm thick) and 10 cm square. A cross section of this sample was observed with an electron microscope to confirm that the tetrapod forms were retained in most part of the whiskers, and such whiskers were uniformly distributed throughout the resin, giving a uniform three-dimensional mesh structure. This sample showed a resistivity of $1\times10^6\Omega$.cm.

Figure 3:
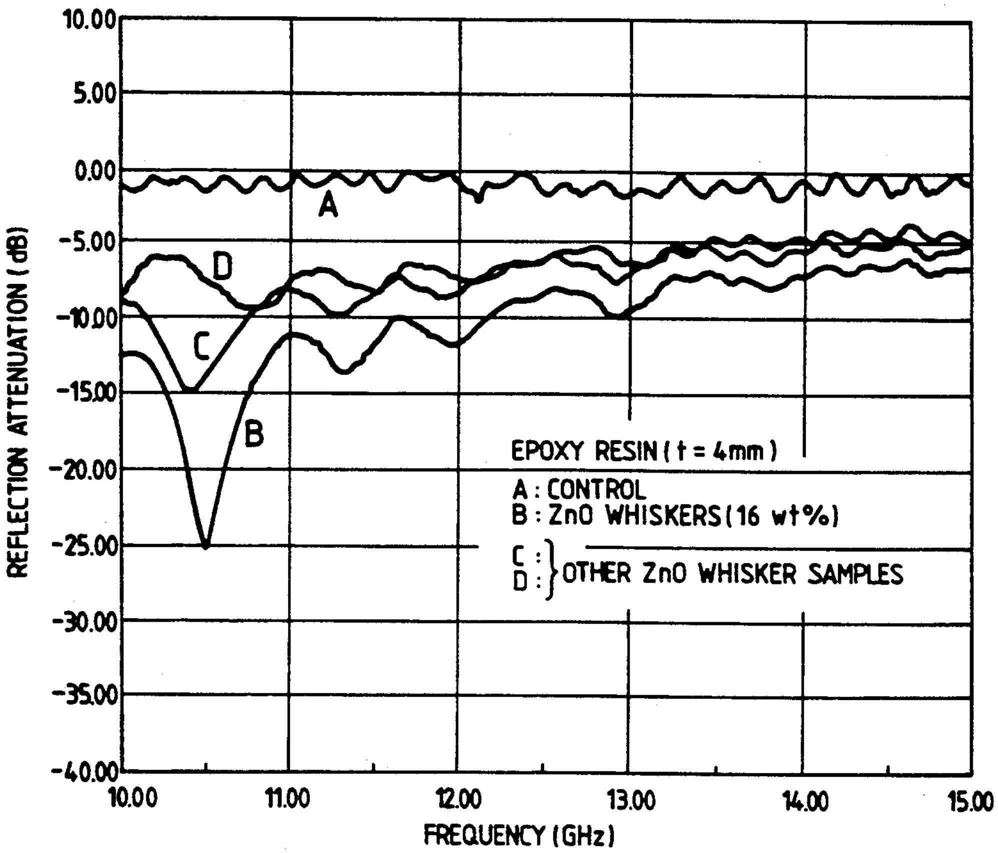
FIGS. 3, 4 and 5 are graphs to show radio wave absorption characteristics of the radio wave absorbing materials according to some embodiments of the present invention.

Using this sample, reflection attenuation characteristics relative to frequencies were measured. As a result, a great attenuation was obtained over a wide band (from 10 to 15 GHz) as shown in FIG. 3, and also the sample was found to be also powerful to polarized waves or obliquely incident waves.

EXAMPLE 2

Based on 100 parts by weight of liquid nitrile rubber (Nipol 1312; a trademark for a product of Nippon Zeon Co., Ltd.), 25 parts by weight of the ZnO whiskers as used in Example 1 was slowly added, and various additives, a vulcanizing agent S (2.0), an activating agent ZnO (3.0), an accelerator Butyl 8 (1.0), and an age resistor (1.0) (part or parts by weight in all parentheses), were further added. These were gently stirred and thoroughly blended in the manner that substantially no shear may be applied. The resulting pasty mixture was passed through even-speed three rolls having been subjected to surface release treatment, to form a sheet with a given thickness. This was heated under pressure, using a piston-type mold, to give a vulcanized rubber sheet (2 mm thick).

A cross section of this sample was observed with an electron microscope to find that about 40% of tetrapod-like whiskers were in a broken state, but most of the ZnO whiskers retained the tetrapod forms.

Using this sample, reflection attenuation characteristics relative to frequencies were measured. As a result, a great attenuation of not more than −7 dB was obtained over a wide band (from 10 to 15 GHz). This rubber was also found to have a very high adhesion to all sorts of adhesives or double-sided adhesive tapes.

EXAMPLE 3

100 parts by weight of polyethylene fine powder of 3 to 10 μm in particle diameter and 40 parts by weight of ZnO whiskers as used in Example 1 were gently and thoroughly blended. The blended product was then introduced into a press tool, and heated at 160° C. for 5 minutes, followed by pressure molding to give a plate-like sample of 4 mm thick and 10 cm square. A cross section of this sample was observed with an electron microscope to confirm that most ZnO whiskers had the tetrapod forms and formed a porous cross section, and in which the polyethylene served as a binder.

In this sample also, very good radio wave absorption characteristics and polarized wave or oblique incidence characteristics were obtained.

EXAMPLE 4

Tetrapod-like ZnO whiskers were prepared, which were 45 μm in average length from the base to the top and 2 μm in average diameter at the base. Based on 100 parts by weight of EPDM, 200 parts by weight of the ZnO whiskers were mixed, and the mixture was kneaded, heated, vulcanized, and molded. The resulting sample was 2 mm thick and 10 cm square.

A cross section of this sample was observed with an electron microscope to find that most ZnO whiskers had lost their tetrapod forms to give needle-like or rod-like ZnO whiskers. The aspect ratio (=length/major axis) of the present ZnO whiskers was 11 in average, and the ratio of the diameter at the base to the diameter at the top was 0.65 in average.

Figure 4:
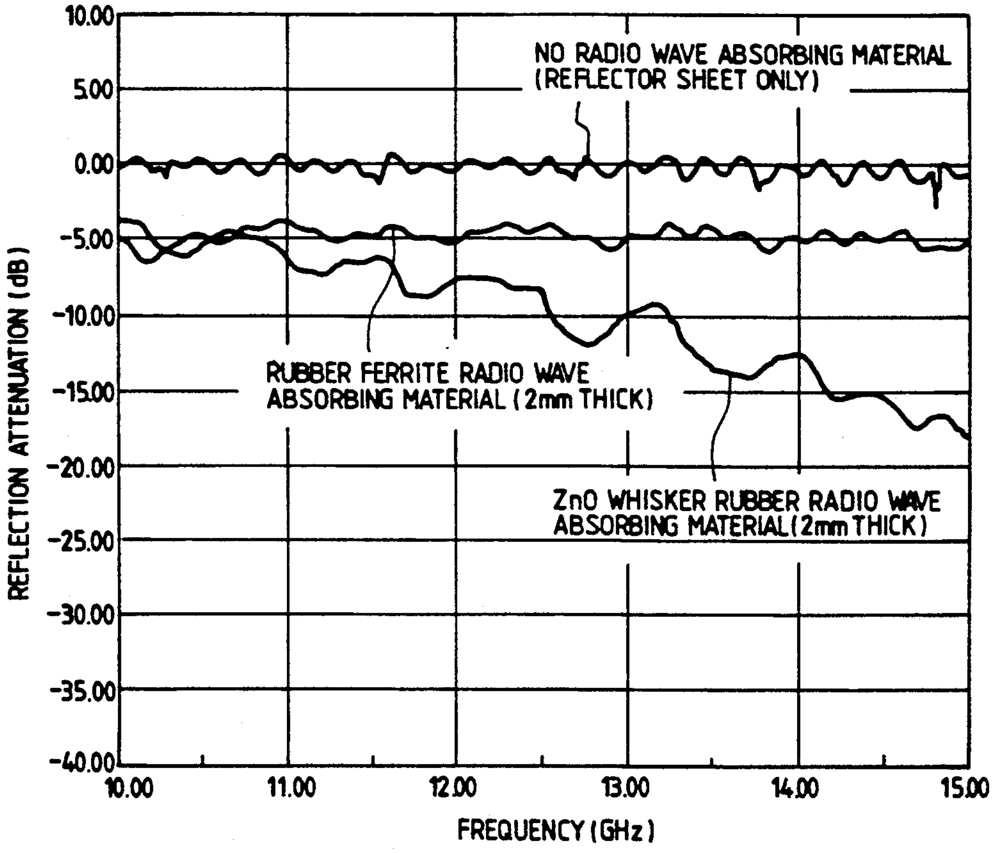

Using this sample, reflection attenuation characteristics relative to frequencies were measured. As a result, high attenuation characteristics were obtained over a wide band (from 10 to 15 GHz). and, as shown in FIG. 4, the sample was found to have a very higher performance than the hitherto commercially available radio wave absorbing material of a rubber ferrite type. The rubber of this Example showed a resistivity of not less than $10^{15}\Omega$.cm.

EXAMPLE 5

The same ZnO whiskers as in Example 1 was prepared, and slowly added (21.5 wt. %) into a molten pellet of polypropylene. The mixture was kneaded and then ejection-molded to give a sample of 3 mm thick and 10 cm square.

A cross section of this sample was observed with an electron microscope to find that most ZnO whiskers had lost their tetrapod forms and oriented in the direction of the flow of resin. In the course of their preparation, however, the wear damage given to the kneader and molding machine was small when compared with other comparative materials. The molded sample itself was also found to be soft and flexible to bending or the like for the amount of the ZnO whiskers mixed. The aspect ratio of the ZnO whiskers observed on a cross section was not less than 15 in average.

Figure 5:
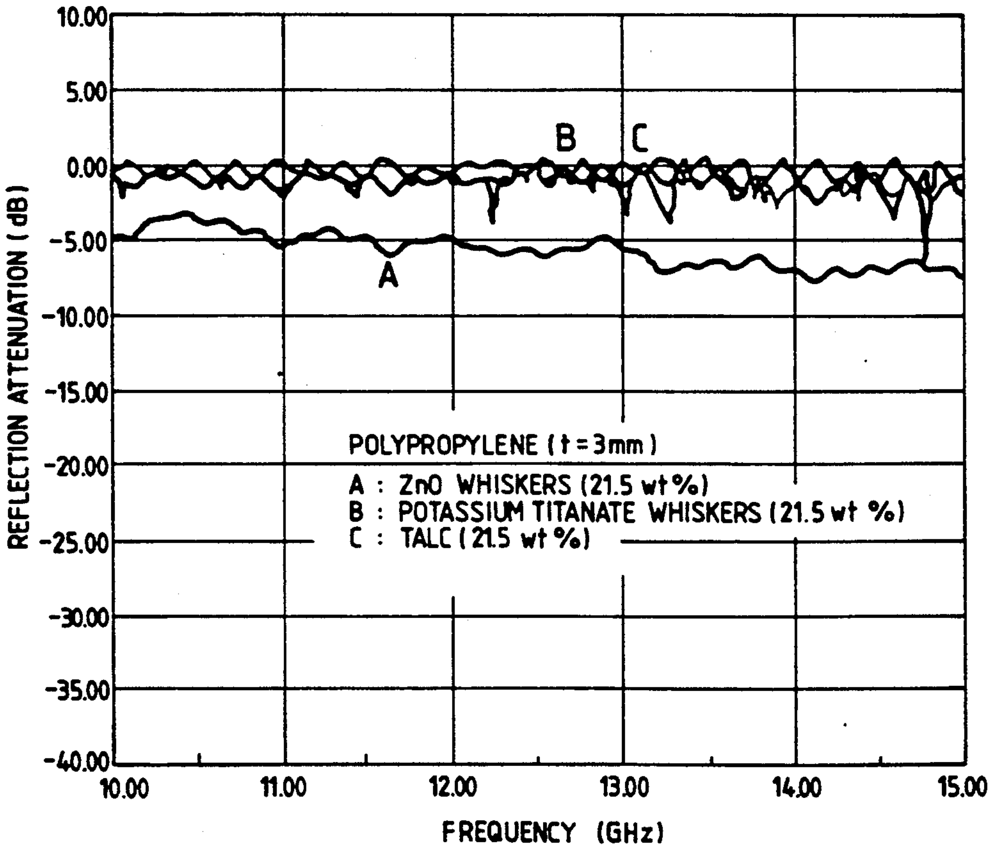

Using this sample, reflection attenuation characteristics relative to frequencies were measured. As a result, high attenuation characteristics were obtained over a wide band (from 10 to 15 GHz). The results thereof are shown in FIG. 5.

EXAMPLE 6

The ZnO whiskers as used in Example 1, SiC whiskers (a product of Tokai Carbon Co., Ltd.), potassium titanate whiskers subjected to reduction and made conductive (1 to 5 μm in diameter; aspect ratio: 100 to 600; 1Ω.cm), nonconductive potassium titanate whiskers, zinc white, and carbon black were each put in a polyethylene bag. In this state, these were each molded with a thickness of 30 mm, and reflection attenuation characteristics relative to frequencies were measured. As a result, the attenuation effect (at 10 to 15 GHz) was ranked in the order of: ZnO whiskers>>SiC whiskers>conductive potassium titanate whiskers>>zinc white>carbon black≠nonconductive potassium titanate whiskers. Thus, it was clearly confirmed that the ZnO whiskers were very suited materials in respect of the radio wave absorbing performance.

EXAMPLE 7

Using the same samples (except for thickness) as in Examples 1 to 6, radio wave absorption at a band of from 100 MHz to 1 GHz was evaluated. As a result, great radio wave absorption characteristics were obtained over a very wide band.

In the above Examples, the radio wave absorbing materials were evaluated as those of a single layer type. Without limitation thereto, however, it is needles to say that the radio wave absorbing material of the present invention may be combined with a modified layer or combined with various kinds of other radio wave absorbing materials so that multiple layer radio wave absorbing materials can be fabricated by the use of conventional methods.

EXAMPLE 8

Metallic zinc powder having oxide layers on its particle surfaces was heated in an atmosphere containing oxygen to form tetrapod-like ZnO whiskers. The resulting ZnO whiskers were 100 μm in average length from the base to the top of the needle crystal projection, and 6 μm in average diameter at the base, most of which had the tetrapod shapes. The resistivity was $1.5\times10^4$Ω.cm under conditions of 5 kg/cm$^2$, 50 VDC, 200 μm thick.

Figure 6:
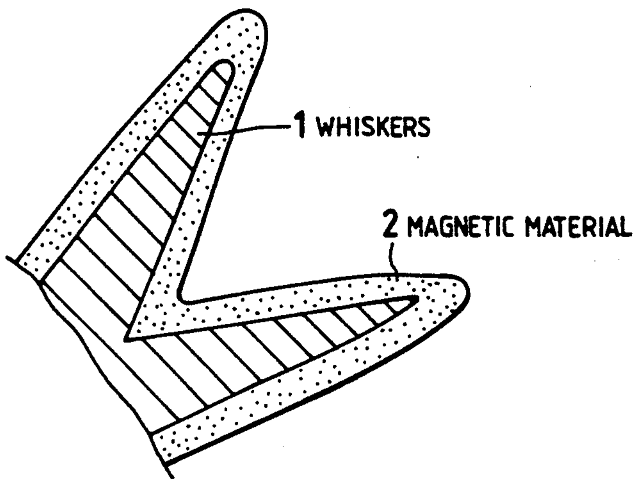
FIG. 6 is a diagrammatic partial cross section of coated ZnO whiskers used in the present invention.

Next, 1 l of an acrylate coating material solution (10%) diluted with toluene was prepared, into which 100 g of $MO.Fe_2O_3$ ($M^{2+}$:Ni, Zn) ferrite powder (particle diameter: 2 to 5 μm) and 100 g of the above ZnO whiskers were gently added. While the resulting mixture was gently thoroughly stirred, it was dried in an atmosphere of 50° C. Ferrite-coated ZnO whiskers were thus obtained (FIG. 6).

This product was mixed into an acrylate coating material (30 wt. %) to give a coating material containing the ferrite-coated ZnO whiskers (coating thickness: 2 to 100 μm in average).

This coating material was uniformly applied on an aluminum plate (2 mm thick) with a thickness of 3.5 mm, and then well dried to give a measurement sample.

Figure 7:
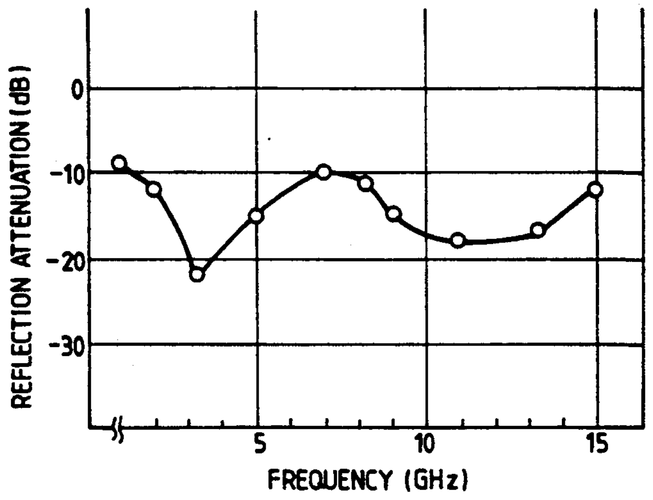
FIG. 7 is a graph to show radio wave absorption characteristics of the radio wave absorbing material according to an embodiment of the present invention.

The reflection attenuation characteristics of this sample was measured to give the results as shown in FIG. 7, and the sample was found to show a great radio wave absorbing performance over a wide band.

EXAMPLE 9

On the surfaces of the ZnO whiskers as used in Example 1, nickel was deposited by electroless plating to give nickel metal-coated ZnO whiskers (coating thickness: 100 Å in average).

The resulting whiskers (500 parts by weight) were incorporated into EPDM rubber, followed by pressure molding to give a rubber plate of 5 mm thick.

An aluminum plate (2 mm thick) was applied to the back of this sample, and reflection attenuation at 1 GHz was measured to find that it was −14 dB, showing a great radio wave absorbing performance.

In these Examples, the radio wave absorbing materials were evaluated as those of a single layer type. Without limitation thereto, however, it is needless to say that the radio wave absorbing material of the present invention may be combined with a modified layer or combined with various kinds of other radio wave absorbing materials so that multiple layer radio wave absorbing materials can be fabricated by the use of conventional methods.

EXAMPLE 10

Figure 8:
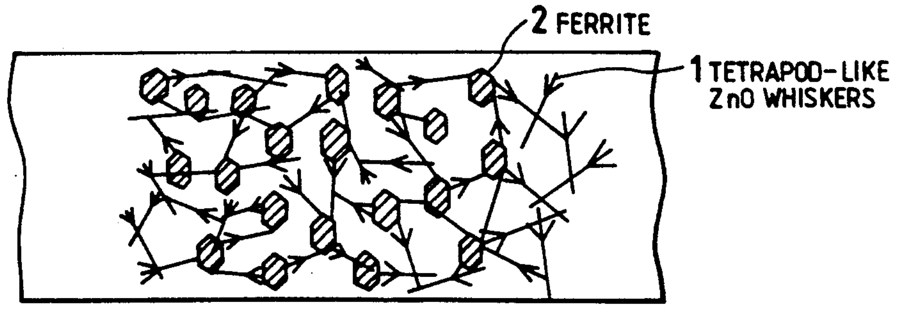
FIG. 8 is a sectional view of the radio wave absorbing material according to an embodiment of the present invention.

FIG. 8 illustrates a composite radio wave absorbing material formed by mixture of powdery tetrapod-like ZnO whiskers 1 and ferrite 2.

The ferrite powder as used in Example 8 was used as the ferrite, and 6 wt. % of tetrapod-like ZnO whiskers of 100 μm in average length from the base to the top, 4 μm in average diameter at the base and 0.05 in diameter ratio was mixed into it. The resulting mixture (200 parts by weight) was added in liquid silicone rubber, which were thoroughly kneaded, and then molded to give a sheet of 3 mm thick.

Next, reflection attenuation characteristics were measured to reveal that the bandwidths showing −15 dB or less became twice or more compared with a conventional sheet comprised of only ferrite 2.

EXAMPLE 11

Tetrapod-like ZnO whiskers of 120 μm in average length from the base to the top, 6 μm in average diameter at the base and 0.01 in diameter ratio was prepared ($1\times10^4$Ω.cm; 5 kg/cm$^2$, 50 VDC, 200 μm thick). The whiskers (17 wt. %) were mixed into liquid silicone rubber (a product of Toshiba Silicone Co., Ltd.; trade name: YE 5822, and the mixture was poured into a mold, followed by heat-curing at 100° C. for 1 hour to give a white rubber sheet (3.5 mm thick).

Figure 9:
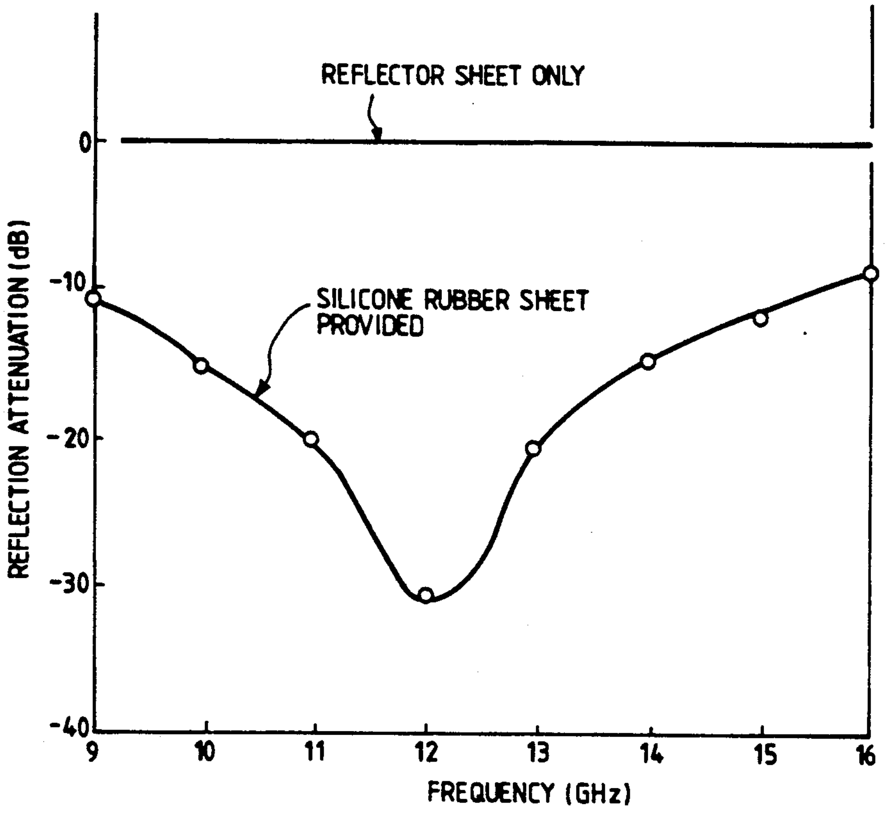
FIG. 9 shows radio wave absorption characteristics of the radio wave absorbing material according to an embodiment of the present invention.

Next, using a reflector plate made of aluminum, the reflection attenuation characteristics of the above rubber sheet were measured to confirm that this sheet was a radio wave absorbing material with a large attenuation over a wide band (FIG. 9).

In order to examine the degree of orientation of the whiskers, the rubber sheet was turned by 90° to examine the reflection attenuation characteristics. There, however, were observed no changes at all, and the whiskers were found to be randomly oriented in all directions, thus giving a radio wave absorbing material which is powerful regardless of the direction of incidence of radio waves and also powerful to polarized waves.

As having been described in the above, the present invention is a really novel needle radio wave absorbing material having been hitherto not available, which can very efficiently absorb and attenuate radio waves. In recent years, there is a rapidly increasing demand relating to EMI or EMC, as in the problems involved in the start of satelite broadcast, or microwave communication, satelite communication, radars, and microwave ovens, and also the problems of the ghosts on VHF or UHF televisions. In this sense, this epock-making invention is a very important invention with great significance, that can afford to broadly confer benefits on not only those who design such equipment but also those who will live in the future all over the world.

What is claimed is:

1. A radio wave absorbing material comprising not less than 1 wt. % of zinc oxide whiskers held with or dispersed in a radio-wave-absorptive or radio-wave-transmissive holding material, wherein each of the zinc oxide whiskers has at least one needle crystal projection which includes a basal part and a tip opposite the basal part, wherein the length of the projection from the basal part to the tip is not less than 3 μm.

2. The radio wave absorbing material according to claim 1, wherein the zinc oxide whiskers have an aspect ratio of not less than 3.

3. The radio wave absorbing material according to claim 1, wherein the zinc oxide whiskers have a resistivity within the range of from 10 to $10^8 \Omega$.cm.

4. The radio wave absorbing material according to claim 1, wherein each zinc oxide whisker comprises a central body and a plurality of needle crystal projections extending radially from said central body.

5. The radio wave absorbing material according to claim 4, wherein said plurality of needle crystal projections consists of four needle crystal projections.

6. The radio wave absorbing material according to claim 1, wherein the holding material comprises a synthetic resin, a rubber, a coating material, a ceramic, a glass, a concrete, a mortar, an inorganic or organic fiber, grain, powder or flake, an inorganic binder, an organic binder, a wax, a gel-like semi-solid substance, or a foam, or mixtures thereof.

7. The radio wave absorbing material according to claim 1, wherein the zinc oxide whiskers are formed by subjecting metallic zinc powder having oxide layers on its particle surfaces to heat treatment in an oxygen-containing atmosphere.

8. A radio wave absorbing material comprising i) particles or fibers of ferrite, carbon, conductive potassium titanate, silicon carbide, a metal, or mixtures thereof, and ii) not less than 1 wt. % of zinc oxide whiskers as a radio wave absorbing element, both of which are held with or dispersed in a radio-wave-absorptive or radio-wave-transmissive holding material, wherein each of the zinc oxide whiskers has at least one needle crystal projection which includes a basal part and a tip opposite the basal part, wherein the length of the projection from the basal part to the tip is not less than 3 μm.

9. The radio wave absorbing material according to claim 8, wherein the holding material comprises a synthetic resin, a rubber, a coating material, a ceramic, a glass, a concrete, a mortar, an inorganic or organic fiber, grain, powder or flake, an inorganic binder, an organic binder, a wax, a gel-like semi-solid substance, or a foam, or mixtures thereof.

* * * * *